US011505033B2

(12) United States Patent
Göthlin et al.

(10) Patent No.: US 11,505,033 B2
(45) Date of Patent: Nov. 22, 2022

(54) MODULE FOR ACCOMMODATING AND COOLING ELECTRONIC CIRCUITRY IN A VEHICLE

(71) Applicant: Volvo Car Corporation, Gothenburg (SE)

(72) Inventors: Jonas Göthlin, Torslanda (SE); Martina Oldenburg, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 79 days.

(21) Appl. No.: 17/075,811

(22) Filed: Oct. 21, 2020

(65) Prior Publication Data

US 2021/0138872 A1 May 13, 2021

(30) Foreign Application Priority Data

Nov. 8, 2019 (EP) ..................................... 19207951

(51) Int. Cl.
*B60H 1/00* (2006.01)
*B60K 11/08* (2006.01)
*B60K 35/00* (2006.01)

(52) U.S. Cl.
CPC ..... *B60H 1/00871* (2013.01); *B60H 1/00021* (2013.01); *B60K 11/085* (2013.01); *B60H 2001/00078* (2013.01); *B60K 35/00* (2013.01)

(58) Field of Classification Search
CPC ............ B60H 1/00021; B60H 1/00821; B60H 1/00871; B60H 2001/00078;
(Continued)

(56) References Cited

U.S. PATENT DOCUMENTS 4,520,425 A * 5/1985 Ito ........................ H02M 7/003
361/753
5,669,813 A * 9/1997 Jairazbhoy ......... B60H 1/00271
361/645
(Continued)

FOREIGN PATENT DOCUMENTS

CN         100402360 C  *  7/2008  ............. B60G 13/14
DE       102005061506 A1    7/2007
(Continued)

OTHER PUBLICATIONS

Luo, Alan A. "Magnesium Casting Technology for Structural Applications." Journal of Magnesium and Alloys, vol. 1, No. 1, 2013, pp. 2-22., https://doi.org/10.1016/j.jma.2013.02.002. (Year: 2013).*
(Continued)

*Primary Examiner* — Jenna M Hopkins
(74) *Attorney, Agent, or Firm* — Clements Bernard Walker; Christopher L. Bernard

(57) ABSTRACT

A module for accommodating electronic circuitry which advantageously is able to take advantage of air in a climate system for cooling of the electronic circuitry. In one aspect, there is provided a module for accommodating electronic circuitry in a vehicle, the module includes: at least one attachment surface for attachment of electronic circuitry thereon, an air guiding structure for receiving an air flow for cooling of the attachment surface, the air guiding structure having a wall member including the attachment surface such that the wall member provides a thermal path between the attachment surface and the air in the air guiding structure, wherein the air guiding structure includes an inlet configured to receive air for cooling of the attachment surface wherein the air flow is an air flow used for climate control in the vehicle.

16 Claims, 4 Drawing Sheets

(58) Field of Classification Search
CPC ........... B60H 2001/00092; B60H 2001/00614; B60H 2001/003
See application file for complete search history.

(56) References Cited

U.S. PATENT DOCUMENTS

| | | | | |
|---|---|---|---|---|
| 5,715,140 | A * | 2/1998 | Sinkunas | B60R 16/0215 361/627 |
| 6,094,927 | A * | 8/2000 | Anazawa | H01M 10/613 62/239 |
| 6,388,881 | B2 * | 5/2002 | Yamauchi | B60K 37/06 361/627 |
| 11,059,519 | B2 * | 7/2021 | Persson | B62D 21/15 |
| 2004/0074248 | A1 * | 4/2004 | Tanaka | B60H 1/00514 62/244 |
| 2007/0000231 | A1 * | 1/2007 | Otsuka | B60H 1/248 60/203.1 |
| 2009/0024275 | A1 | 1/2009 | Hayes et al. | |
| 2010/0116568 | A1 * | 5/2010 | Kadoi | B60L 3/0046 454/144 |
| 2010/0202107 | A1 | 8/2010 | Noisternig et al. | |
| 2010/0231035 | A1 * | 9/2010 | Tsuchiya | B60H 1/00285 307/9.1 |
| 2012/0003910 | A1 * | 1/2012 | Richter | B60H 1/00385 454/141 |
| 2014/0060795 | A1 * | 3/2014 | Yu | B60H 1/00821 454/152 |
| 2016/0159194 | A1 * | 6/2016 | Minamiura | B60L 7/14 165/42 |
| 2017/0106717 | A1 * | 4/2017 | Mitani | B60H 1/143 |
| 2017/0106718 | A1 * | 4/2017 | Nakano | B60K 6/28 |
| 2017/0217284 | A1 * | 8/2017 | Ji | B60H 1/00978 |
| 2017/0327058 | A1 * | 11/2017 | Takezawa | B60H 1/00278 |
| 2017/0341482 | A1 * | 11/2017 | Takezawa | H01M 10/613 |
| 2017/0361676 | A1 * | 12/2017 | Androulakis | B60N 2/5685 |
| 2018/0015806 | A1 * | 1/2018 | Yasuda | B60L 58/26 |
| 2020/0156442 | A1 * | 5/2020 | Cosgrove | H01M 10/63 |
| 2021/0046798 | A1 * | 2/2021 | Natale | B60H 1/00821 |
| 2021/0138872 | A1 * | 5/2021 | Göthlin | B60H 1/246 |

FOREIGN PATENT DOCUMENTS

| | | | |
|---|---|---|---|
| DE | 10200903762 A1 | 2/2010 | |
| DE | 102009034762 A1 * | 2/2010 | ......... B60H 1/00271 |
| DE | 102010040710 A1 * | 3/2012 | ......... B60H 1/00514 |
| DE | 102010040710 A1 | 3/2012 | |
| DE | 102015016500 B3 | 3/2017 | |
| DE | 102020126157 A1 * | 4/2021 | ......... B60H 1/00064 |
| EP | 2008840 A1 | 12/2008 | |
| EP | 2937921 A1 * | 10/2015 | ......... B60H 1/00021 |
| FR | 3077771 A1 * | 8/2019 | ......... B60H 1/00021 |
| GB | 2349691 A * | 11/2000 | ........... B60H 1/0005 |
| JP | 2004196282 A * | 7/2004 | ......... B60H 1/00514 |
| JP | 2004268629 A * | 9/2004 | |
| WO | WO-2005085046 A1 * | 9/2005 | ........... B60H 1/0055 |
| WO | WO-2015011550 A1 * | 1/2015 | ............... B60H 1/00 |

OTHER PUBLICATIONS

May 4, 2020 European Search Report issued on International Application No. 19207951.

Apr. 29, 2022 Office action issued in the corresponding EP application No. 19207951.5.

* cited by examiner

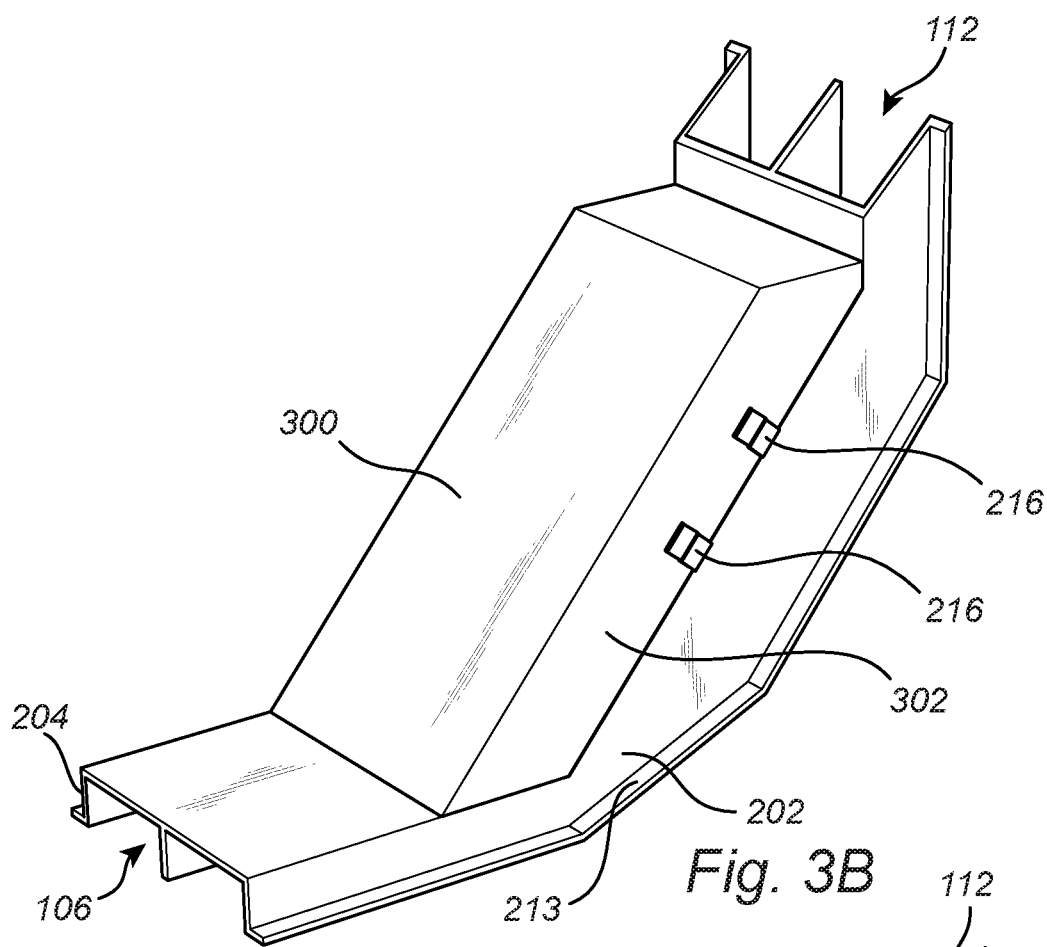
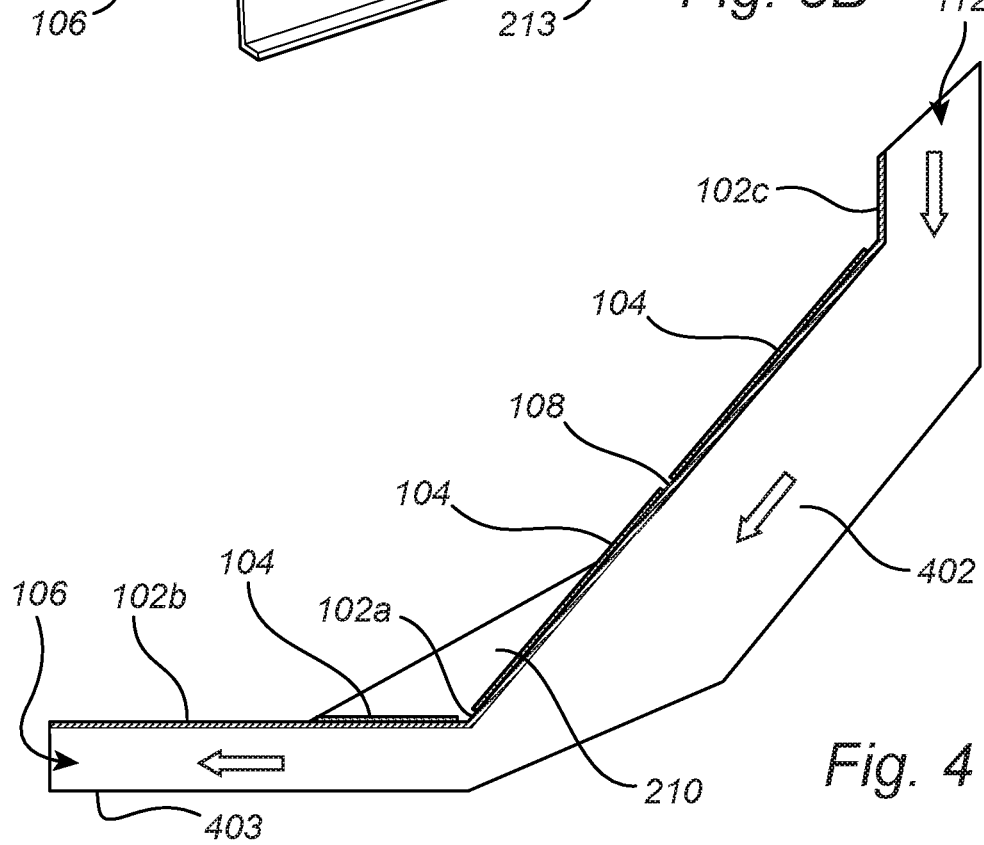

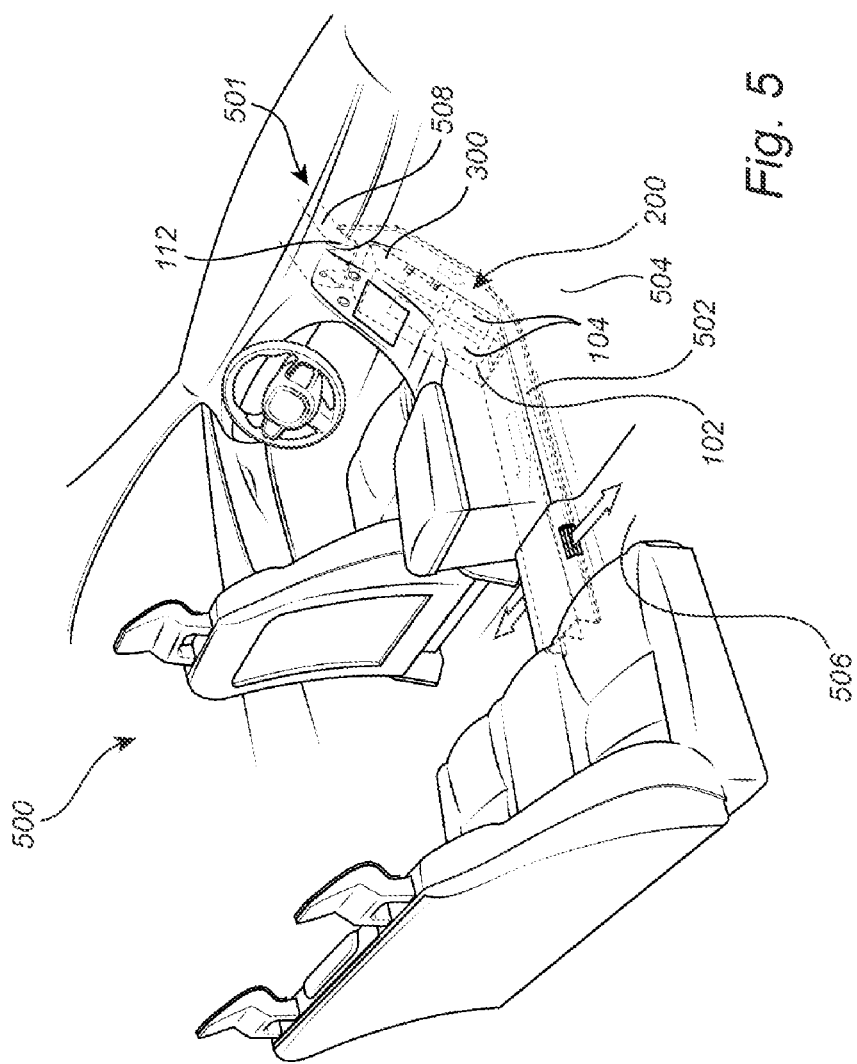

MODULE FOR ACCOMMODATING AND COOLING ELECTRONIC CIRCUITRY IN A VEHICLE

CROSS-REFERENCE TO RELATED APPLICATION

The present disclosure claims the benefit of priority of co-pending European Patent Application No. 19207951.5, filed on Nov. 8, 2019, and entitled "A MODULE FOR ACCOMODATING AND COOLING ELECTRONIC CIRCUITRY IN A VEHICLE," the contents of which are incorporated in full by reference herein.

TECHNICAL FIELD

The present disclosure generally relates to a module for accommodating electronic circuitry in a vehicle.

BACKGROUND

The number of electronic components in vehicles have been increasing steadily for decades. The increase is to a large part due to the increased demand for electrification of vehicles, but also due to the connectivity of vehicles and the more advanced active safety systems and infotainment systems that today's vehicles are being equipped with.

With the increasing number of electronic components comes packaging issues. The electronic components must be stored somewhere where they may be accessible, and where the environment of the electronic components is suitable. For example, electronic components may need some degree of cooling for sustained operation.

Electronic components are often arranged in boxes that occupy space and that typically are relatively heavy. In order to decrease the overall weight of the vehicle one may reduce the number of boxes. However, this must not come at the cost of insufficient cooling and obstructed maintenance possibilities due to inaccessibility.

Accordingly, there is a need for improved ways of accommodating electronics in vehicles.

SUMMARY

The disclosed subject matter generally relates to a module for accommodating electronic circuitry which advantageously can take advantage of air in a climate system for cooling of the electronic circuitry. The disclosed module can at least alleviate some of the above drawbacks in prior art electronic boxes.

There is a need to reduce the number of electronic boxes in vehicles. This may be enabled by collecting a plurality of the electronic circuitry in fewer places. Further, it was realized that the prior art electronic boxes add weight to the vehicle. Therefore, the present disclosure uses an already present structure in the vehicle for storage and cooling of electronic circuitry.

There is also cool air circulating in the climate system of the vehicle. The cooled air must be guided in e.g. ducts or channels in order to reach a dedicated location in the vehicle. Based on this realization, a module is formed for accommodating electronic circuitry from a wall member of a guiding structure that is used for guiding an air flow in the climate control system. Thus, the air flow for cooling the electronic circuitry may be part of the climate system of the vehicle.

The herein disclosed module includes an attachment surface for the attachment of the electronic circuits, the wall member is part of the guiding structure where the cooling air is flowing. Accordingly, the wall member serves both for guiding the air in the climate system of the vehicle and as part of a storage for electronic circuitry in the vehicle, thereby reducing the number of separate electronic boxes in the vehicle and providing for a more compact packaging solution for electronic circuitry in vehicles.

In one aspect, there is provided a module for accommodating electronic circuitry, preferably in a vehicle, the module includes: at least one attachment surface for attachment of electronic circuitry thereon, an air guiding structure for guiding an air flow for cooling of the attachment surface, the air guiding structure having a wall member including the attachment surface such that the wall member provides a thermal path between the attachment surface and the air in the air guiding structure, wherein the air guiding structure includes an inlet configured to receive the air flow for cooling of the attachment surface wherein the air flow is an air flow used for climate control in the vehicle.

The air guiding structure may be included in a climate control system. Thus, the air guiding structure may be adapted to transfer an air flow to a dedicated location for air ventilation or conditioning purposes for the climate system. For example, the air guiding structure may be arranged to guide air from the climate control system to an air vent in the vehicle. Accordingly, there are unused surfaces in the climate system that may be used for accommodating and cooling electronic circuitry.

Further, in embodiments, the module may be provided as a beam being part of the vehicle body structure. Accordingly, the beam may include the guiding structure for transferring air for the climate system of the vehicle. At the same time, the beam includes an attachment surface for the attachment of the electronic circuitry thereon. Thus, the module provided in this form, serving functions for both the climate system and for reinforcing the vehicle structure, reduces the overall weight of the vehicle even further.

Further features of, and advantages with, the embodiments of the present disclosure will become apparent when studying the appended claims and the following description. The skilled person realize that different features of the present disclosure may be combined to create embodiments other than those described in the following, without departing from the scope of the present disclosure.

BRIEF DESCRIPTION OF THE DRAWINGS

These and other aspects of the present disclosure will now be described in more detail, with reference to the appended drawings showing example embodiments of the disclosure, wherein:

FIG. 3B is a conceptual illustration of a module with a cover structure according to embodiments of the present disclosure;

FIG. 4 is a cross-section of an example module according to embodiments of the present disclosure; and FIG. 5 conceptually illustrates a vehicle including a module according to embodiments of the present disclosure.

DETAILED DESCRIPTION

Figure 1:
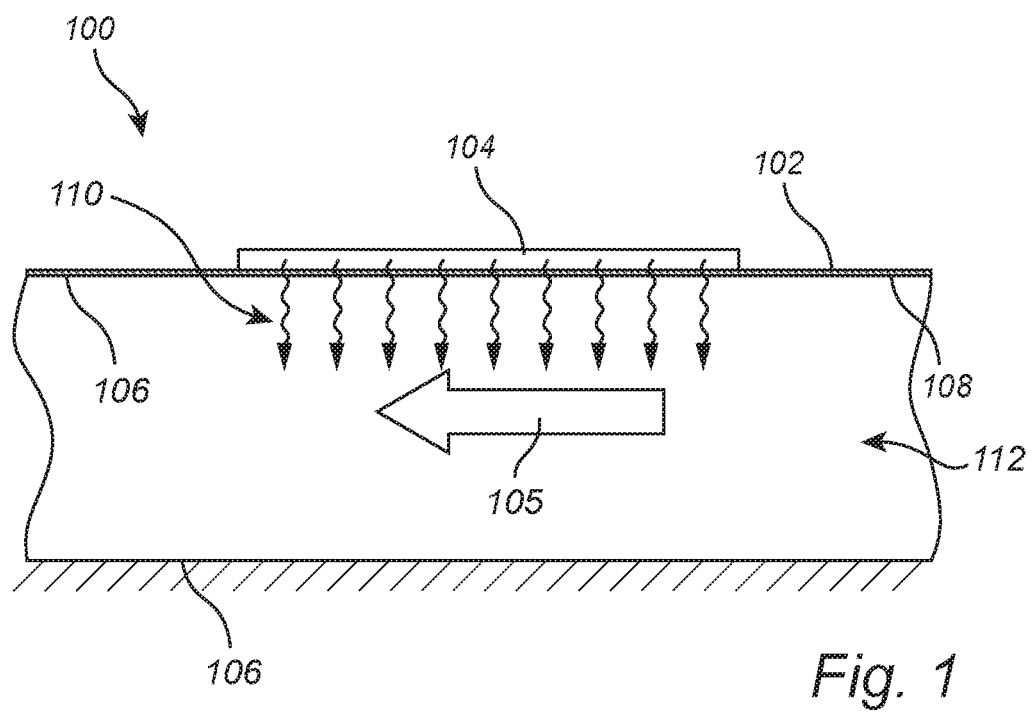
FIG. 1 is a schematic cross-section of a module according to embodiments of the present disclosure.

In the present detailed description, various embodiments of a module according to the present disclosure are described. However, the module may be embodied in many different forms and should not be construed as limited to the embodiments set forth herein; rather, these embodiments are provided for thoroughness and completeness, and to fully convey the scope of the present disclosure to the skilled person. Like reference characters refer to like elements throughout.

FIG. 1 illustrates a module 100 for accommodating electronic circuitry according to embodiments of the present disclosure. The module 100 includes at least one attachment surface 102 for attachment of electronic circuitry 104 thereon. The module includes an air guiding structure 106 for guiding an air flow 105 for cooling of the attachment surface 102. The air guiding structure 106 having a wall member 108 including the attachment surface 102 whereby the wall member 108 provides a thermal path 110 between the attachment surface 102 and the air in the air guiding structure 106, wherein the air guiding structure 106 includes an inlet 112 configured to receive the air flow for cooling of the attachment surface from a climate control system. The received air flow is an air flow used for climate control in a user compartment.

An air guiding structure is configured to guide air from the inlet to an outlet. The air guiding structure is preferably air tight, and may be provided as a channel or a duct. The air guiding structure thus includes wall members forming the duct. At least one of the wall members includes the attachment surface on a side opposite the side where the air is guided in the air guiding structure. In other words, the air flow that is guided by the air guiding structure is not directly in contact with the attachment surface. The attachment surface is located on an opposite side of the wall member in relation to the air flow side of the wall member.

A climate control system may include at least one of a include heating, ventilation, and air conditioning systems for the user compartment, a so-called HVAC-system. The user compartment may be a vehicle interior, e.g. a vehicle cabin where occupants are seated. Accordingly, the climate control system may be responsible for e.g. regulating the temperature in the vehicle interior, ensure that fresh air is circulated in to the vehicle interior, defrosting the windshield and side windows when needed. Inevitably, a climate control system requires air ducts or channels for transportation air to various location in the vehicle. One or more of these air duct or channels may include a wall member having a surface that can be used as an attachment surface for electronic circuitry as disclosed herein.

The inlet is an opening into the air guiding structure adapted to receive an air flow that is circulated by the climate control system of the vehicle. The air guiding structure may be included in the climate control system of the vehicle. Using an already present structure for the storage of electronic circuitry provides for improved packaging which reduces the space required for storing electronic circuitry and a reduction in the overall weight of the vehicle due to reduce need for dedicated electronic boxes.

The attachment surface is adapted to receive and enable fixation of the electronic circuitry, or generally electric circuit boards. For example, the electronic circuitry may be printed on printed circuit boards that are screwed onto the attachment surface or that are clipped onto the attachment surface. The electronic circuitry, regardless of the technique used for attaching them to the attachment surface, is attached in a way that ensures thermal contact with the attachment surface such that heat may be transferred from the electronic circuitry to the attachment surface.

A thermal path for heat to be transferable from the electronic circuitry arranged on the attachment surface to the air in the guiding structure. The electronic circuitry is heated during operation, the heat is transferred to the material of the wall member. Subsequently, the heat is transferred to air in the guiding structure by interaction between the air and the wall member, and transferred away by the air flow. The wall member is thus not thermally insulating where the attachment surface is located.

The module may be provided having the electronic circuitry attached on the attachment surface.

The module may be adapted for accommodating electric circuitry in a vehicle. The climate control system may be a climate control system of the vehicle.

Figure 2:
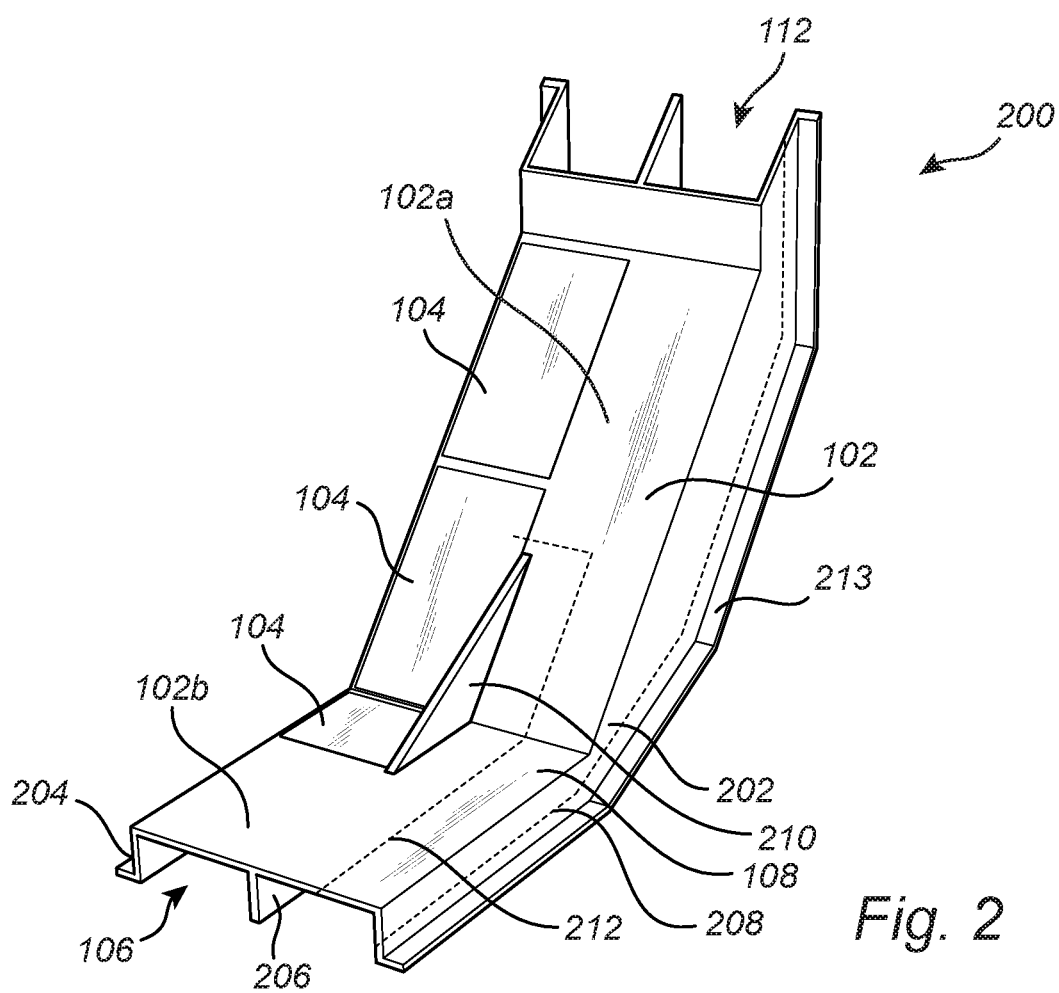
FIG. 2 conceptual illustration of a module according to embodiments of the present disclosure.

FIG. 2 is a conceptually illustrates a module 200 according to embodiments of the present disclosure. The module 200 includes the elements described with reference to FIG. 1 and have the same reference numerals in FIG. 2.

In FIG. 2, the attachment surface 102a-b is shown to have multiple electronic circuitries 104 attached thereto, here illustrated as three electric circuit boards 104 or printed circuit boards. However, the attachment surface 102a-b may receive more than three electric circuit boards 104, for example, multiple further electronic circuitries may be attached to the available space on the attachment surface next to the illustrates electronic circuitries 104. The attachment surface 102a-b is located outside the air guiding structure 106 where the air flow is guided.

The air guiding structure 106 includes side wall members 202 and 204. The side-wall members 202 and 204 may be arranged in parallel with each other. The side-wall members 202 and 204 are connected to each other via the wall member 108, here in the illustrated orientation of the module 200, the wall member 108 forms a top wall member. The side-wall members 202 and 204 and the wall member 108 are preferably made in one piece.

Further, the air guiding structure 106 may include at least one intermediate air guiding structure 206 for forming parallel paths for the air flow. By forcing the air to flow through parallel paths provides for more homogenous distribution of the air flow laterally across the wall member 108 and thereby to improved cooling of the electronic circuitry. The lateral direction of the wall member 108 is perpendicular to the air flow direction in the air guiding structure 106. The intermediate air guiding structure 206 may be parallel with the side wall member 202 and the side wall member 204.

The attachment surface 102a-b is substantially planar for improved physical contact between the electric circuitry 104 and the attachment surface to thereby improve the thermal contact with the air flow on the opposite side of the wall member 108.

Further, the attachment surface 102 includes sub-surfaces 102a, 102b that are inclined with respect to each other. The module 200 is shaped so that the air guiding structure 106 guides the air flow along a turning path 208, e.g. curved path or a path that changes direction. As will be described below, this shape provides for an advantageous location for the module 200 that allows for easy access to the electronic circuitry 104. A reinforcing element 210 is attached to the sub-surfaces 102a, 102b for strengthening the structural integrity of the module. The reinforcing element 210 is arranged to mechanically strengthen the module against rotational deformation of the sub-surfaces 102a, 102b with respect to each other at the joint between the sub-surfaces 102a, 102b.

The electronic circuitries are configured to communicated with vehicle sub-systems. The communication may be provided by wireless technology, or hardwired technology. For example, in one embodiment, the wall member 108 optionally includes electrical paths 212 for electric signaling from the electronic circuitry to electronic subsystems of the vehicle. The electrical paths 212 may be formed directly on the surfaces 102a-b. However, preferably, the electrical paths are provided through electrical communication ports 216 as will be described with reference to subsequent drawings.

The air guiding structure 106 may form a duct or a channel when attached to a suitable support structure. Alternatively, the air guiding structure 106 includes a further wall member that reaches between the side wall members 202 and 204 so that the further wall member, the side wall members 202 and 204, and the top wall member 108 form a duct or channel. The further wall member may be considered a bottom wall member relative the top wall member, in other words the bottom wall member is arranged opposite the top wall member. The bottom wall member may be parallel to the top wall member 108. When the air guiding structure 106 is attached to a support structure, the flanges 213 (only one is numbered) may be welded, bolted, or by other means attached to the support structure.

Figure 3A:
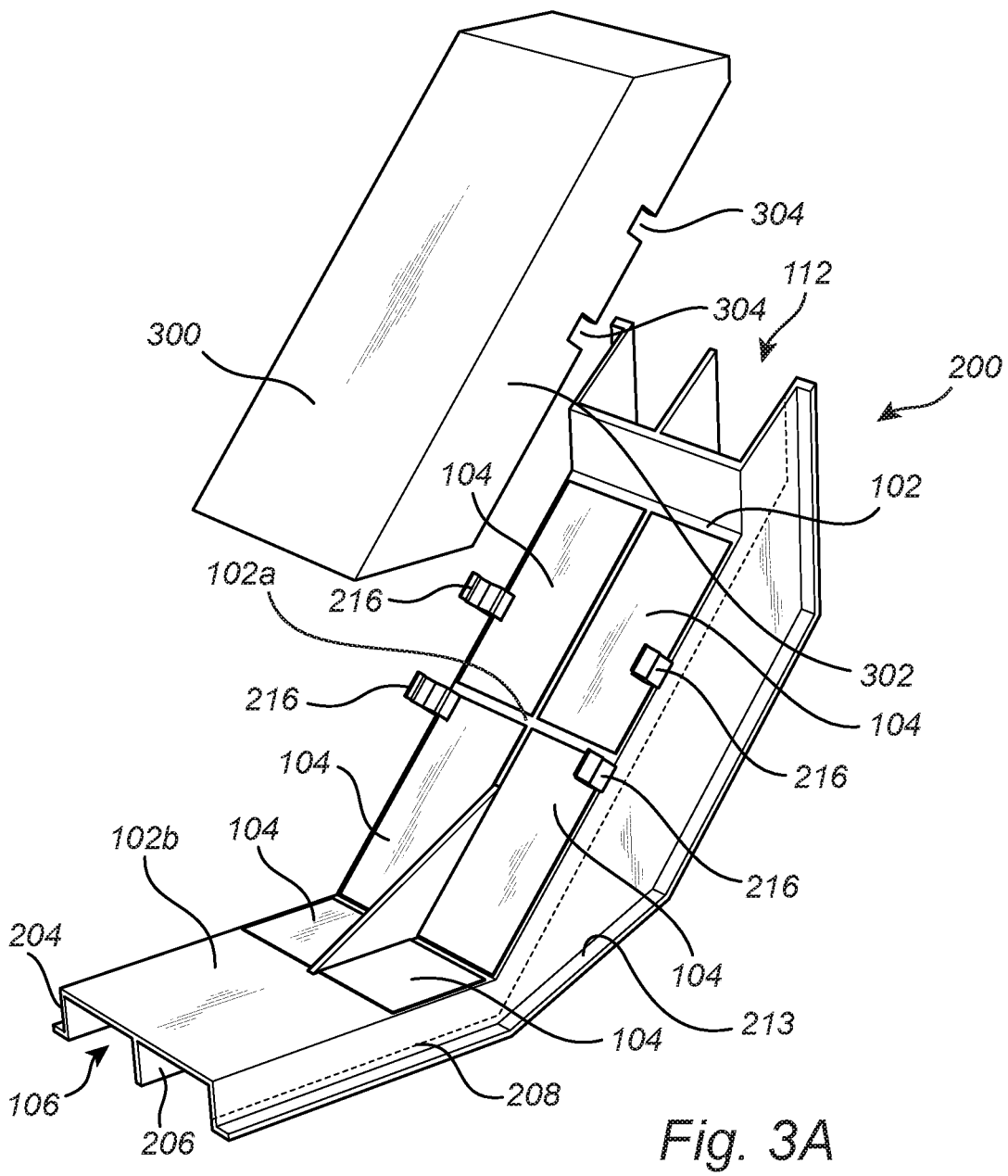
FIG. 3A is a conceptual illustration of a module according to embodiments of the present disclosure.

FIG. 3A illustrates the module 200 including electronic circuitry provided as electric circuit boards 104 that are attached to the attachment surfaces 102a-b. In order to enclose the electronic circuitry, the module 200 may include a cover 300 adapted to cover the electronic circuitry attached to the attachment surface 102a-b.

The cover 300 is adapted to provide a tight fit on the surfaces 102a-b to enclose the electronic circuitry 300 between the surfaces 102a-b and the cover 300. The cover includes side structures 302 of which one is shown, the other one is located in the opposite side of the cover 300, in parallel with the shown side structure 302. The outline of the side structures 302 provides the tight fit with the surfaces 102a-b. Further, the side structures 302 includes throughholes 304 through which electrical communication ports 216 are accessible when the cover 300 is arranged to enclose the electric circuitries 104, as illustrated in FIG. 3B.

FIG. 4 is a cross-sectional view of the module 200 illustrating the air flow 402 that is guided by the air guiding structure 106 including a conceptually illustrated support structure 403 that the guiding structure 106 is mounted on, and wall member 108 including the surfaces 102a-c. The support structure, the guiding structure 106 and the wall member 108 form a duct or channel. In some possible implementations, the support structure 403 is part of the module 200.

Further, it may be possible but not preferable, to have electrical leads reach from the attachment surface 102a through the wall member 108 and into the air guiding structure 106. Thus, the guiding structure may be used for accommodating leads for routing of electric signals from the electronic circuitry to electric sub-systems of the vehicle.

An electric sub-system may be any system in the vehicle that may be controlled by an electronic control unit, ECU, or the vehicle, such as propulsion systems, entertainment systems, infotainment systems, lighting system, active safety systems, etc. The electronic control unit may be included in the electric circuitry 104 arranged in a module as herein disclosed.

FIG. 5 illustrates a vehicle 500 including a module 200 according to the present disclosure. The module 200 is arranged covered by an instrument panel 501 in the vehicle 500. In this location, the electronic circuitry is relatively easy to access for maintenance and replacement.

In embodiments, the module may be a reinforcing structure of the vehicle. Such a reinforcing structure may for example be an extruded beam 502 arranged to strengthen the structural integrity of the vehicle body. More precisely, the module may be formed by the beam 502 being part of the vehicle body structure. In other words, it may be possible to use a hollow structural component primarily intended for the structural integrity of the vehicle body, as a module for accommodating electric circuitry. The beam 502 may be configured to reinforce the vehicle floor.

As illustrated in FIG. 5, the beam 502 extends to a rear floor 506 of the vehicle. The air may be guided in a direction from a front floor 504 to the rear floor 506. The air guiding structure 106 in the beam 502 is arranged to guide air from the front part of the vehicle to the rear part of the vehicle. Thus, the beam provides an air duct or channel for transferring air used for climate control in the vehicle.

The air guiding structure 106 may be arranged to receive air through its inlet 112 for climate control and to guide the air past a portion of the wall member 108 opposite the attachment surface 102 and towards a floor of the vehicle. The air is received via a duct 508 connected to the inlet and to a climate control system (not shown) of the vehicle.

The module, excluding the cover, is preferably made from magnesium, or from an alloy including magnesium. Thus, the beam 502 is preferably made from magnesium, or from an alloy including magnesium. Magnesium provides for a light-weight module that may still provide mechanical strength for vehicle body reinforcement.

A reinforcing structure 502 for a vehicle body, the reinforcing structure including: at least one attachment surface for attachment of electronic circuitry thereon, and an air guiding structure 106 for receiving an air flow for cooling of the attachment surface, the air guiding structure having a wall member 108 including the attachment surface whereby the wall member provides a thermal path between the attachment surface and the air in the air guiding structure, wherein the air guiding structure includes an inlet 112 configured to receive air for cooling of the attachment surface, wherein the air flow is an air flow used for climate control in the vehicle.

The reinforcing structure may be an extruded beam.

There is further provided a vehicle including a module according to embodiments of the present disclosure.

The embodiments of the present disclosure are preferably adapted for use in a vehicle, although other possible implementations are possible, where a climate control system air flow way be used for cooling electronic circuitry as described herein.

A control unit may include a microprocessor, microcontroller, programmable digital signal processor or another programmable device, as well as be embedded into the vehicle/power train control logic/hardware. The control unit may also, or instead, include an application-specific integrated circuit, a programmable gate array or programmable array logic, a programmable logic device, or a digital signal processor. Where the control unit includes a programmable device such as the microprocessor, microcontroller or programmable digital signal processor mentioned above, the processor may further include computer executable code that controls operation of the programmable device. The control unit may include components in either hardware or software, or partially in hardware or software and communicate using known transmission buses such as CAN-bus and/or wireless communication capabilities.

The person skilled in the art realizes that the present disclosure by no means is limited to the preferred embodiments described above. On the contrary, many modifications and variations are possible within the scope of the appended claims.

In the claims, the word "comprising" does not exclude other elements or steps, and the indefinite article "a" or "an" does not exclude a plurality. A single processor or other control unit may fulfill the functions of several items recited in the claims. The mere fact that certain measures are recited in mutually different dependent claims does not indicate that a combination of these measured cannot be used to advantage. Any reference signs in the claims should not be construed as limiting the scope.

Various examples have been described. These and other examples are within the scope of the following claims.

The invention claimed is:

1. An assembly unit for accommodating electronic circuitry in a vehicle, the assembly unit comprising:
    at least one attachment surface for attachment of electronic circuitry comprising a printed circuit board by screwing or clipping the printed circuit board directly on the at least one attachment surface,
    an air tight air guiding structure for guiding an air flow from an inlet to an outlet, the air guiding structure having a wall member including the attachment surface, wherein the attachment surface is on an opposite side of the wall member in relation to the air flow such that the attachment surface is not in direct contact with the air flow, whereby the wall member provides a thermal path between the attachment surface and the air flow guided by the air guiding structure for cooling of the attachment surface and thereby the printed circuit board, wherein the inlet is configured to receive the air flow for cooling of the attachment surface, wherein the received air flow is an air flow used for climate control in the vehicle, and
    a cover adapted to cover the electronic circuitry attached to the attachment surface, wherein the cover comprises side structures defining through-holes through which electronic communication ports associated with the electronic circuitry are accessible.

2. The assembly unit according to claim 1, wherein the air guiding structure is arranged to guide the air flow to an air vent in the vehicle for climate control.

3. The assembly unit according to claim 1, wherein the air guiding structure is included in a climate control system of the vehicle.

4. The assembly unit according to claim 1, wherein the assembly unit is a reinforcing structure of the vehicle.

5. The assembly unit according to claim 1, wherein the assembly unit is a beam that is part of a vehicle body structure of the vehicle.

6. The assembly unit according to claim 5, wherein the beam extends from a front floor of the vehicle to a rear floor of the vehicle.

7. The assembly unit according to claim 1, wherein the assembly unit is a beam configured to reinforce a floor of the vehicle.

8. The assembly unit according to claim 1, wherein the air guiding structure is arranged to receive the air flow for climate control and to guide the air flow past a portion of the wall member opposite the attachment surface and towards a floor of the vehicle.

9. The assembly unit according to claim 8, wherein the air guiding structure is adapted to guide the air flow to a rear floor of the floor of the vehicle.

10. The assembly unit according to claim 1, wherein the air guiding structure includes at least one intermediate air guiding structure for forming parallel paths for the air flow.

11. The assembly unit according to claim 1, wherein the electronic circuitry includes a plurality of electric circuit boards.

12. The assembly unit according to claim 1, wherein the attachment surface is located outside the air guiding structure.

13. The assembly unit according to claim 1, wherein the assembly unit is made from a material including magnesium.

14. A vehicle comprising an assembly unit according to claim 1.

15. A reinforcing structure for a vehicle body, the reinforcing structure comprising:
    at least one attachment surface for attachment of electronic circuitry comprising a printed circuit board by screwing or clipping the printed circuit board directly on the at least one attachment surface, and
    an air tight air guiding structure for guiding an air flow from an inlet to an outlet, the air guiding structure having a wall member including the attachment surface, wherein the attachment surface is on an opposite side of the wall member in relation to the air flow such that the attachment surface is not in direct contact with the air flow, whereby the wall member provides a thermal path between the attachment surface and the air flow guided by the air guiding structure for cooling of the attachment surface and thereby the printed circuit board, wherein the inlet is configured to receive the air flow for cooling of the attachment surface, wherein the received air flow is an air flow used for climate control in the vehicle, and
    a cover adapted to cover the electronic circuitry attached to the attachment surface, wherein the cover comprises side structures defining through-holes through which electronic communication ports associated with the electronic circuitry are accessible.

16. The reinforcing structure according to claim 15, wherein the reinforcing structure is an extruded beam.

* * * * *